(12) United States Patent
Allison et al.

(10) Patent No.: US 7,078,008 B2
(45) Date of Patent: Jul. 18, 2006

(54) PROCESS FOR CONVERTING ALKANES TO CARBON FILAMENTS

(75) Inventors: Joe D. Allison, Ponca City, OK (US); Sriram Ramani, Ponca City, OK (US); Priya Rangarajan, Ponca City, OK (US); Kenneth M. York, Ponca City, OK (US); Troy L. Amundson, Garber, OK (US); Gary E. Welch, Ponca City, OK (US)

(73) Assignee: Conocophillips Company, Houston, TX (US)

( * ) Notice: Subject to any disclaimer, the term of this patent is extended or adjusted under 35 U.S.C. 154(b) by 556 days.

(21) Appl. No.: 10/263,315

(22) Filed: Oct. 1, 2002

(65) Prior Publication Data
US 2004/0062704 A1    Apr. 1, 2004

(51) Int. Cl.
*D01F 9/127* (2006.01)
(52) U.S. Cl. ................................. 423/447.3; 518/702
(58) Field of Classification Search ............ 423/447.3; 518/702
See application file for complete search history.

(56) References Cited

U.S. PATENT DOCUMENTS

| | | | |
|---|---|---|---|
| 4,339,413 A | 7/1982 | Lahne et al. ............... 422/200 |
| 4,445,916 A * | 5/1984 | Newton ....................... 62/625 |
| 4,572,813 A | 2/1986 | Arakawa .................... 264/29.2 |
| 4,628,065 A | 12/1986 | Prouteau et al. ............. 518/700 |
| 4,663,230 A | 5/1987 | Tennent ....................... 428/367 |
| 5,149,584 A | 9/1992 | Baker et al. ................. 428/297 |
| 5,165,909 A | 11/1992 | Tennent et al. ............ 423/447.3 |
| H1311 H | 5/1994 | Nakamura et al. .......... 518/713 |
| 5,413,866 A | 5/1995 | Baker et al. ................ 423/447.2 |
| 5,424,054 A | 6/1995 | Bethune et al. ............ 423/447.2 |
| 5,456,897 A | 10/1995 | Moy et al. ................ 423/447.3 |
| 5,500,200 A | 3/1996 | Mandeville et al. ...... 423/447.3 |
| 5,569,635 A | 10/1996 | Moy et al. ................... 502/185 |
| 5,578,543 A | 11/1996 | Tennent et al. ............. 502/180 |
| 5,589,152 A | 12/1996 | Tennent et al. .......... 423/447.3 |

(Continued)

FOREIGN PATENT DOCUMENTS

EP         0198558        10/1986          ...................... 9/12

(Continued)

OTHER PUBLICATIONS

Gary G. Tibbets, Carbon Fibers Produced by pyrolysis of Natural Gas in Stainless Stel Tubes. 1983. pp. 666-668, Appl. Phys. Lett. 42.*

(Continued)

*Primary Examiner*—Stuart L. Hendrickson
*Assistant Examiner*—Alvin Raetzsch
(74) *Attorney, Agent, or Firm*—Conley Rose LLP (57) ABSTRACT

The present invention includes a process for producing carbon filaments and synthesis gas from a mixture of alkanes, preferably natural gas, comprising converting a first portion of the alkanes, preferably $C_2^+$ hydrocarbons, directly to carbon filaments and converting a second portion of the alkanes, preferably methane, to syngas. The natural gas may be separated into a first feed stream comprising ethane, propane, and butane and a second feed stream comprising methane. The first feed stream is fed to a carbon filament CF reactor to produce carbon filaments and hydrogen. The second feed stream is fed to a syngas production reactor to produce syngas. Alternatively, the natural gas is fed to at least one carbon filament reactor that is maintained at an effective temperature to convert $C_2^+$ hydrocarbons in the natural gas to carbon filaments and hydrogen, thereby filtering methane from the natural gas.

4 Claims, 3 Drawing Sheets

U.S. PATENT DOCUMENTS

| | | | | |
|---|---|---|---|---|
| 5,591,312 | A | 1/1997 | Smalley | 204/157.41 |
| 5,618,875 | A | 4/1997 | Baker et al. | 524/495 |
| 5,654,491 | A | 8/1997 | Goetsch et al. | 568/469.9 |
| 5,707,916 | A | 1/1998 | Snyder et al. | 502/180 |
| 5,726,116 | A | 3/1998 | Moy et al. | 502/182 |
| 5,747,161 | A | 5/1998 | Iijima | 428/367 |
| 5,767,039 | A | 6/1998 | Yamagishi et al. | 502/342 |
| 5,780,101 | A | 7/1998 | Nolan et al. | 427/216 |
| 5,877,110 | A | 3/1999 | Snyder et al. | 502/180 |
| 5,965,267 | A | 10/1999 | Nolan et al. | 428/408 |
| 6,129,901 | A | 10/2000 | Moskovits et al. | 423/447.3 |
| 6,143,689 | A | 11/2000 | Moy et al. | 502/170 |
| 6,159,892 | A | 12/2000 | Moy et al. | 502/174 |
| 6,183,714 | B1 | 2/2001 | Smalley et al. | 423/447.3 |
| 6,225,358 | B1* | 5/2001 | Kennedy | 518/700 |
| 6,225,359 | B1* | 5/2001 | O'Rear et al. | 518/706 |
| 6,333,016 | B1* | 12/2001 | Resasco et al. | 423/447.3 |

FOREIGN PATENT DOCUMENTS

| | | | | |
|---|---|---|---|---|
| GB | 1469930 | 4/1977 | | 9/12 |
| JP | 117622 | 7/1982 | | 423/447.3 |
| SU | 729211 | 4/1980 | | 8/9 |
| SU | 925969 | 5/1982 | | 8/9 |

OTHER PUBLICATIONS

M. Audier, A. Oberlin and M. Coulon, *Crystallographic Orientations of Catalytic Particles in Filamentous Carbon: Case of Simple Conical Particles*, 1981, pp. 549-556, *Journal of Crystal Growth*.

M. Audier, P. Bowen and W. Jones, *Transmission Electron Microscope Study of Single Crystals of $Fe_7C_3$*. 1983, pp. 125-134, *Journal of Crystal Growth*.

M. Audier. J. Guinot. M. Coulon and L. Bonnetain, *Formation and Characterization of Catalytic Carbons Obtained From CO Disproportionation Over an Iron Nickel Catalyst—II* . 1981, pp. 99-105. *Carbon*.

M. Audier. A. Oberlin and M. Oberlin. *Morphology and Crystalline Order in Catalytic Carbons*, 1981, pp. 217-224, *Carbon*.

M. Audier, M. Coulon and A. Oberlin. *Relative Crystallographic Orientation of Carbon and Metal in a Filamentous Catalytic Carbon*. 1979. pp. 73-76. *Carbon*.

T. Baird, J.R. Fryer and B. Grant, *Carbon Formation on Iron and Nickel Foils by Hydrocarbon Pyrolysis—Reactions at 700° C.*, 1974, pp. 591-602, *Carbon*.

T. Baird, J.R. Fryer and B. Grant, *Structure of Fibrous Carbon*, 1971, pp. 329-330. *Nature*.

R.T.K. Baker, J.J. Chludzinski, Jr., N.S. Dudash and A. J. Simoens, *The Formation of Filamentous Carbon From Decomposition of Acetylene Over Vanadium and Molybdenum*, 1983, pp. 463-468, *Carbon*.

R.T.K. Baker and J.J. Chludzinski, Jr., *Filamentous Carbon Growth on Nickel-Iron Surfaces: The Effect fo Various Oxide Additives*. 1980. pp. 464-478, *Journal of Catalysis*.

R.T.K. Baker, *Catalytic Growth of Carbon Filaments*, 1989, pp. 315-323. *Carbon*.

R.T.K. Baker and P.S. Harris. *The Formation of Filamentous Carbon*, 1973. pp. 83-165. *Chemistry and Physics of Carbon*.

C.A. Bernardo, I. Alstrup and J.R. Rostrup-Nielsen, *Carbon Deposition and Methane Steam Reforming on Silica-Supported Ni-Cu Catalysts*, 1985. pp. 517-534, *Journal of Catalysis*.

A.S. Bodke, D. Henning, L.D. Schmidt, S.S. Bharadwaj, J.J. Maj and J. Siddall, *Oxidative Dehydrogenation of Ethane at Millisecond Contact Time: Effect of $H_2$ Addition*, 1999. pp. 62-74, *Journal of Catalysis*.

H.P. Boehm, *Carbon From Carbon Monoxide Disproportionation on Nickel and Iron Catalysts: Morphological Studies and Possible Growth Mechanisms*, 1973, pp. 583-590, *Carbon*.

E. Boellaard, P.K. De Bokx, A. J. H. M. Kock and J.W. Geus. *The Formation of Filamentous Carbon on Iron and Nickel Catalysts*, 1985, pp. 481-490, *Journal of Catalysis*.

P.K. De Bokx, A. J. H. M. Kock, E. Boellaard, W. Klop and J.W. Geus, *The Formation of Filamentous Carbon on Iron and Nickel Catalysts*, 1985, pp. 454-467, *Journal of Catalysis*.

John P. Bradley and Peter R. Buseck, *Catalytically Grown Carbon Filaments from a Smelter Aerosol*, 1983, pp. 770-772, *Nature*.

Makoto Egashira, H. Katsuki and S. Kawasumi, *Preparation of Carbonaceous Materials Whiskerized with Carbon Fibers (Part 3) Carbon Whiskerization on the Polyacrylonitrile- and Pitch-based Carbon Fibers*, 1985. pp. 411-412, *Sekiyu Gakkaishi*.

Morinobu Endo, T. Koyama and Y. Hishiyama, *Structural Improvement of Carbon Fibers Prepared from Benzene*, 1976, pp. 2073-2076, *Japanese Journal of Applied Physics*.

E.L. Evans, J.M. Thomas, P.A. Thrower and P.L. Walker, *Growth of Filamentary Carbon on Metallic Surfaces During the Pyrolysis of Methane and Acetone*, 1973, pp. 441-445, *Carbon*.

M. Huff and L.D. Schmidt, *Production of Olefins by Oxidative Dehydrogenation of Propane and Butane Over Monoliths at Short Contact Times*, 1994, pp. 127-141, *Journal of Catalysis*.

D.I. Iordanoglou, A.S. Bodke and L.D. Schmidt, *Oxygenates and Olefins From Alkanes in a Single-Gauze Reactor at Short Contact Times*, 1999, pp. 400-409, *Journal of Catalysis*.

M. Kandni, M. Coulon, L. Bonnetain, *Vapor Grown Carbon Fibers—Methane Decomposition*, Largs—Enseeg—BP 75—France.

A.J.H.M. Kock, P.K. De Bokx, E. Boellaard, W. Klop and J.W. Geus, *The Formation of Filamentous Carbon on Iron and Nickel Catalysts*, 1985, pp. 468-480, *Journal of Catalysis*.

Tsuneo Koyama, M. Endo and Y. Hishiyama, *Structure and Properties of Graphitized Carbon Fiber*, 1974, pp. 1933-1939, *Japanese Journal of Applied Physics*.

Tsuneo Koyama, M. Endo and Y. Hishiyama, *Carbon Fibers Obtained by Thermal Decomposition of Vaporized Hydrocarbon*, 1972, pp. 445-449. *Japanese Journal of Applied Physics*.

Tsuneo Koyama and M. Endo, *Structure and Grown Process of Vapor-Grown Carbon Fibers*, 1973, pp. 690-696, *Applied Physics*.

Ajay Makkuni, D. Panjala, N. Shah and G.P. Huffman, *Hydrogen and Nanotube Production of Catalytic Decomposition of Ethane*. 2002, pp. 782-784, *Fuel Chemistry Division Preprints*.

Y. Nishiyama and Y. Tamai, *Effect of Hydrogen on Carbon Deposition Catalyzed by Copper-Nickel Alloys*, 1976, pp. 1-5, *Journal of Catalysis*.

Y. Nishiyama and Y. Tamai, *Carbon Formation on Copper-Nickel Alloys from Benzene*, 1974, pp. 98-107, *Journal of Catalysis*.

G.D. Renshaw, C. Roscoe and P.L. Walker. Jr., *Disproportionation of CO 1. Over Iron and Silicon-Iron Single Crystals*, 1970, pp. 164-183, *Journal of Catalysis*.

*Research Opportunities for Materials with Ultrafine Microstructures. Synthesis and Processing: Morphologically Specific Methods*, 1990, pp. 39-58, http://books.nap.edu/books/030904183X/html/39.html.

Struan D. Robertson, *Carbon Formation From Methane Pyrolysis Over Some Transition Metal Surfaces—I. Nature and Properties of the Carbons Formed*, 1970, pp. 365-374, *Carbon*.

Lanny D. Schmidt. J. Siddall, M. Bearden, *New Ways to Make Old Chemicals*. 2000, pp. 1492-1495, *AJChE Journal*.

*Reactivity of Carbon Deposited on Nickel-Copper Alloy Catalysts from the Decomposition of Methane*, 1986, pp. 545-548, *Journal of Catalysis*.

P.A. Tesner. E.Y. Robinovich, L.S. Rafalkes and E.F. Arefieva. *Formation of Carbon Fibers from Acetylene*, 1970, pp. 435-442. *Carbon*.

Gary G. Tibbetts, *Why Are Carbon Filaments Tubular?*, 1983, pp. 632-638, *Journal of Crystal Growth*.

Gary G. Tibbetts, Gary G. Tibbetts. *Carbon Fibers Produced by Pyrolysis of Natural Gas in Stainless Steel Tubes*. 1983, pp. 666-668, *Appl. Phys. Lett. 42*.

G.C. Tibbetts, *Vapor-Grown Carbon Fibers*, 1990, pp. 73-94, J.L. Figueiredo et al. (eds.), Carbon Fibers Filaments and Composites, 73-94.

Roland Weisback, *Pyrolytische Graphit-Kristalle Mit Widkelstruktur*, 1971, pp. 525-526, *Carbon*.

* cited by examiner

PROCESS FOR CONVERTING ALKANES TO CARBON FILAMENTS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

This invention generally relates to the production of carbon filaments. More specifically, the invention relates to a process for converting alkanes found in natural gas directly to carbon filaments.

BACKGROUND OF THE INVENTION

Natural gas reserves have been found in remote areas where it is uneconomical to develop the reserves due to the lack of local markets for the gas and the high cost of transporting the gas to distant markets. This high cost is often related to the extremely low temperatures needed to liquefy the highly volatile gas during transport. An alternative is to locally convert the natural gas to products that can be transported more cost effectively.

Natural gas comprises several components, including alkanes that are usually separated before being fed to different downstream processes. Alkanes are saturated hydrocarbons (compounds containing hydrogen [H] and carbon [C]) whose molecules contain carbon atoms linked together by single bonds. The simplest alkanes are methane ($CH_4$), ethane ($CH_3CH_3$), and propane ($CH_3CH_2CH_3$). Separating the different components of natural gas typically entails subjecting the natural gas to a very expensive, multi-stage process that is performed in a so-called gas plant. Inefficient separation can lead to lower product selectivity and catalyst deactivation resulting from the formation of coke deposits (i.e., low volatile hydrocarbonaceous substances) that plug the micropores and block the active sites of the catalyst. Therefore, a simpler, less expensive, and more efficient process is needed to separate natural gas into useful components.

One process that utilizes hydrocarbon compounds recovered from a gas plant is the oxidative dehydrogenation (ODH) of alkanes to olefins. In ODH, the alkanes are dehydrogenated in the presence of oxygen, typically in a short contact time reactor containing an ODH catalyst, thereby producing olefins. Olefins (also called alkenes) are unsaturated hydrocarbons whose molecules contain one or more pairs of carbon atoms linked together by a double bond. Generally, primary olefin molecules are commonly represented by the chemical formula $CH_2=CHR$, where C is a carbon atom, H is a hydrogen atom, and R is an atom or pendant molecular group of varying composition. Another process using hydrocarbon feed to make carbon monoxide (CO) is the synthesis gas generation via catalytic partial oxidation or reforming reactions.

Olefins and CO are useful as a feedstock for various downstream processes, such as carbon filament production. In a conventional process, carbon filaments are grown during the thermal decomposition of olefins or CO in the presence of a metal catalyst. Producing carbon filaments in this manner depends upon an upstream process generating olefins or CO to supply the feed components for carbon filament growth. Carbon filaments produced from the catalytic decomposition of olefins or CO may have a wide variety of diameters (from tens of nanometers to tens of microns) and structures (e.g., twisted, straight, helical, branched, and mixtures thereof). Carbon filaments, especially when combined within a polymer matrix to form an engineered composite material, are known for their outstanding physical properties. However, the high cost of manufacturing carbon filaments continues to be an impediment to their widespread use. Thus, an ongoing need exists to develop efficient methods for producing carbon filaments. Using a process for converting alkanes directly to carbon filaments in accordance with the present invention eliminates the intermediate step of converting alkanes to olefins or CO, and thus avoids the high operating, equipment, and catalyst costs associated with production of olefins or CO.

SUMMARY OF THE INVENTION

The present invention includes a process for producing carbon filaments and synthesis gas from a mixture of alkanes, comprising converting a first portion of the alkanes directly to carbon filaments and converting a second portion of the alkanes to synthesis gas (syngas), which comprises hydrogen and carbon monoxide. The first portion of alkanes preferably consists essentially of alkanes having more than one carbon atom (i.e., $C_2^+$ hydrocarbons), more preferably consists essentially of ethane, propane, and butane, and most preferably consists essentially of ethane and propane. The second portion of alkanes preferably consists essentially of methane.

The mixed alkanes of the present invention are preferably provided from natural gas. According to a first embodiment, the natural gas is passed to a gas plant to separate into a first feed stream comprising ethane and propane and a second feed stream comprising the methane. The first feed stream is passed directly to a carbon filament (CF) reactor to produce carbon filaments and hydrogen from the ethane and propane. The second feed stream is passed to a syngas production reactor to produce syngas from the methane via partial oxidation (POX), steam reforming, and/or autothermal reforming. The syngas recovered from the syngas production reactor is then fed to a synthesis reactor, such as a Fischer-Tropsch (FT) reactor to produce hydrocarbon liquids or to an alcohol synthesis reactor to produce alcohols.

According to a second embodiment, the natural gas is fed to at least one carbon filament reactor that is maintained at an effective temperature to convert ethane and propane in the natural gas to carbon filaments and hydrogen. Methane in the natural gas remains substantially unconverted at the effective temperature and thus passes through the at least one CF reactor. In this manner, methane is filtered from the natural gas without having to subject the natural gas to a complex separation process. The methane filtered from the natural gas is fed to a syngas production reactor to convert the methane to syngas. The syngas recovered from the syngas production reactor can then be fed to a synthesis reactor such as a FT reactor to produce hydrocarbon liquids or to an alcohol synthesis reactor to produce alcohols.

DESCRIPTION OF DRAWINGS

The invention, together with further advantages thereof, may best be understood by reference to the following description taken in conjunction with the accompanying drawings in which.

DETAILED DESCRIPTION OF THE PREFERRED EMBODIMENTS

According to the present invention, a mixture of alkanes is processed wherein a first portion of the alkanes is converted directly to carbon filaments and another portion of the alkanes is converted to syngas for use in downstream processes. The mixture of alkanes is preferably natural gas. The first portion of the alkanes preferably consists essentially of alkanes having two or more carbon atoms (i.e., C2+ alkanes), and more preferably consists essentially of ethane and propane. The second portion of the alkanes preferably consists essentially of methane. Preferred downstream processes are those suitable for conversion of synthesis gas, i.e., carbon monoxide (CO) and hydrogen ($H_2$), to hydrocarbon liquids, such as the FT process shown in the figures.

Figure 1:
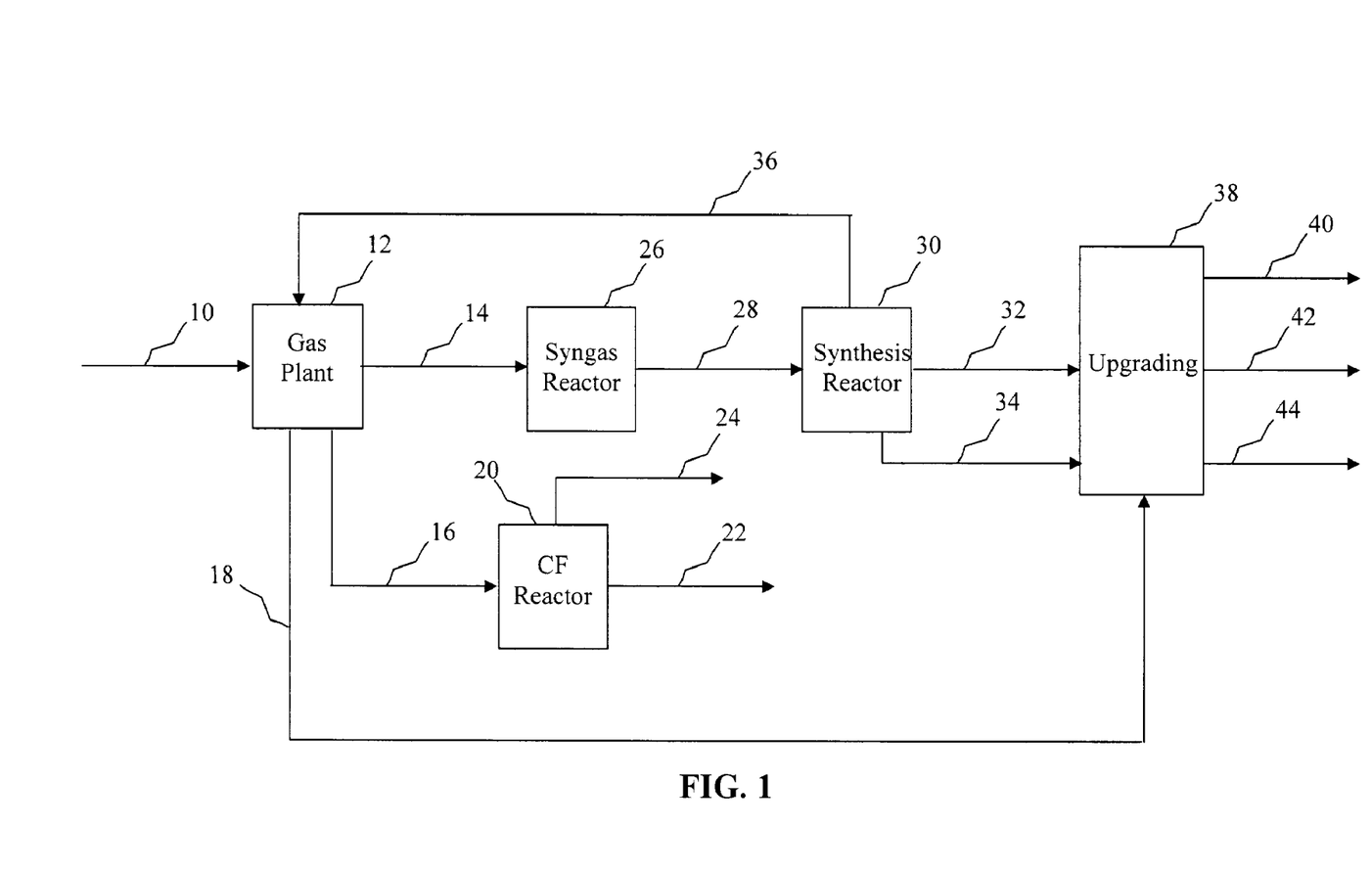
FIG. 1 is a process flow diagram of the present invention, wherein ethane and propane are converted directly to carbon filaments and methane is converted to syngas for use in downstream processes.

Turning to FIG. 1, a natural gas feed stream 10 comprising hydrocarbons is fed to a gas plant 12 for processing into different fractions. Gas plant 12 uses a separator, e.g., a hydrocarbon splitter, to separate feed stream 10 into a methane fraction consisting essentially of methane, an ethane and propane fraction consisting essentially of ethane and propane, and a butanes and higher fraction consisting essentially of C4+ alkanes. The ethane and propane fraction is fed to a CF reactor 20 via stream 16 to thereby form carbon filaments and $H_2$. The CF reactor 20 contains a CF catalyst, i.e., any suitable catalyst for producing carbon filaments from hydrocarbons, and preferably a catalyst optimized for converting alkanes (and more preferably ethane and propane) into carbon filaments. Examples of catalysts that may be employed in CF reactor 20 are metals such as Nickel, Cobalt or alloys such as Monel (Ni—Cu) or Nichrome (Ni—Cr). The catalyst can be in any form, e.g. screens, coils, strips, cylinders, spheres, powders, and the like, such that they can preferably be held in a fixed-bed arrangement and feed gases can be passed through the fixed bed.

The CF reactor 20 effluent comprises carbon filaments, $H_2$, and unconverted ethane and propane. The $H_2$ produced in CF reactor 20 may be recovered using any known separation technique, such as membrane separation. Carbon filaments are removed from CF reactor 20 via product stream 22, and $H_2$ is removed from CF reactor 20 via by-product stream 24. Although not shown, by-product stream 24 can be passed to processes that require $H_2$, e.g., a FT process or a hydrotreater or a hydrocracker or the like. The unconverted hydrocarbons recovered from CF reactor 20 may be further processed via a recycle stream (not shown) to the CF reactor.

The CF catalyst contained within CF reactor 20 is preferably a metal catalyst, defined herein as comprising elemental iron, nickel, cobalt, copper, or chromium; alloys comprising the foregoing metals; oxides of the forgoing metals and alloys; and combinations of the foregoing metals, alloys, and oxides. The CF catalyst may comprise any appropriate structure such as a wire, disk, gauze, mesh, sheets, spheres, rods, or inert supports coated with catalysts. Preferred CF catalysts include Ni gauzes, a nickel-copper alloy screen or wire known as MONEL alloy 400 and a nickel-chromium alloy known as Nichrome, each available from commercial sources.

The CF reactor 20 is configured to support the particular CF catalyst being used and to accommodate harvesting of the carbon filaments upon completion of their growth cycle. The CF reactor 20 is further configured such that the carbon filaments can be removed from the metal catalyst and/or reactor vessel. The CF reactor 20 may be either a batch or continuous reactor, and is preferably a continuous reactor, thus allowing the CF process to operate continuously. A suitable continuous reactor is shown in FIG. 6 of Tibbetts, *Vapor Grown Carbon Fibers*, NATO ASI Series E: Applied Sciences, Vol. 177, pp. 78 (1989), incorporated herein by reference in its entirety.

Within CF reactor 20, ethane and propane are contacted with the CF catalyst in a reaction zone that is maintained at conversion-promoting conditions effective to produce carbon filaments. Conversion-promoting conditions are preferably the optimum flowrate, gas preheat and/or catalyst temperature. Depending on the catalyst arrangement, preheating the feed gas may be preferred over preheating the catalyst. It is preferred to have the temperature of gases contacting the catalyst to be from about 350° C. to about 1000° C., more preferably from about 450° C. to about 800° C. and most preferably from about 550° C. to about 700° C. Feed gas may contain small amounts of nitrogen and hydrogen to improve the heat distribution and contact between the feed gases and catalyst, and also to improve certain properties of the filament product. Ratio of the gas flowrates for hydrocarbon:hydrogen can range from about 1:2 to about 1:0.05, more preferably from about 1:3 to about 1:0.3 and most preferably from about 1:1 to about 1:0.5. Ratio of the gas flowrates for hydrocarbon:nitrogen can range from about 1:1 to about 1:0.1, more preferably from about 1:1 to about 1:0.2 and most preferably from about 1:0.5 to about 1:0.3. Operating pressure ranges from atmospheric to slightly elevated pressures. Gas flowrates in GHSV range from about 1,000 1/hr to about 100,000 1/hr, more preferably from about 5,000 1/hr to about 50,000 1/hr and most preferably from about 10,000 1/hr to about 30,000 1/hr. GHSV is measured at standard temperature and pressure conditions and is defined as normal liters of feed gases per kilogram of catalyst per hour.

FIG. 1 also depicts the methane fraction from gas plant 12 being fed via stream 14 to a syngas reactor 26 for conversion to syngas. An oxygen-containing gas (e.g., pure oxygen, oxygen diluted with an inert gas, air, oxygen-enriched air, and so forth) is combined with the methane over a catalyst disposed within syngas reactor 26, which is preferably a short-contact time reactor (SCTR), such as a millisecond contact time reactor. The partial oxidation of the methane to syngas proceeds by the following exothermic reaction:

$$2CH_4 + O_2 \rightarrow 2CO + 4H_2$$

The syngas reactor 26 contains any suitable catalyst for promoting the conversion of hydrocarbon gas to syngas. For a partial oxidation catalyst, the catalyst comprises a wide range of catalytically active components such as palladium, platinum, rhodium, iridium, osmium, ruthenium, nickel, chromium, cobalt, cerium, lanthanum, and mixtures thereof. A syngas stream 28 comprising $H_2$ and CO is recovered from syngas reactor 26.

Within syngas reactor 26, methane is contacted with the catalyst in a reaction zone that is maintained at conversion-promoting conditions effective to produce $H_2$ and CO. Preferably, syngas reactor 26 is operated at mild conditions to avoid the formation of unwanted by-products. Suitable partial oxidation processes, conditions, and catalysts for use with the present invention are disclosed in, for example, U.S. Pat. Nos. 6,402,989 and 6,409,940; published PCT application WO 02/20395; and published U.S. Pat. Applications 2002-0006374 and 2002-0009407, each of which is incorporated herein by reference in its entirety.

In alternative embodiments, syngas reactor 26 may be replaced with other syngas production units capable of converting methane to syngas, such as a steam reformer and/or an auto-thermal reformer. Steam reforming (SR) entails endothermically reacting light hydrocarbons and steam over a catalyst contained within a plurality of externally heated tubes mounted in a furnace. Auto-thermal reforming (ATR) employs a combination of steam reforming and partial oxidation. More particularly, the endothermic heat required for the steam reforming reaction is obtained from the exothermic partial oxidation reaction.

Syngas stream 28 is fed to a synthesis reactor 30 wherein the syngas is converted to a hydrocarbon liquid product such as FT liquids and/or alcohol, typically by contact with a synthesis catalyst. In a preferred embodiment, synthesis reactor 30 is a FT reactor containing any suitable FT catalyst for promoting the conversion of syngas to hydrocarbon liquids. In an alternative embodiment, synthesis reactor 30 is an alcohol synthesis reactor containing any suitable catalyst for promoting the conversion of syngas to one or more alcohols, preferably methanol. The reaction zone within synthesis reactor 30 is maintained at conversion-promoting conditions effective to produce the hydrocarbon liquids.

In the FT reactor embodiment, the catalysts may include any of the Fischer-Tropsch catalysts known in the art. The FT catalyst preferably comprises a catalytically effective amount of catalytic metal. The catalytic metal is preferably selected from the Groups 8, 9, or 10 metals, more preferably cobalt, iron, nickel, and combinations thereof. The catalytic metal preferably comprises cobalt, and more preferably consists essentially of cobalt. The amount of catalytic metal present in the FT catalyst may vary widely. When the catalytic metal is cobalt, the FT catalyst preferably comprises cobalt in an amount totaling from about 1% to about 50% by weight (as the metal) of total catalyst composition (catalytic metal, support, and any optional promoters), more preferably from about 10% to about 40% by weight, still more preferably from about 15% to about 35% by weight. It will be understood that % indicates percent throughout the present specification. The FT catalyst may also comprise a promoter selected from Groups 1–11 and 13 of the Periodic Table (New Notation). The promoter is preferably at least one of rhenium, ruthenium, platinum, palladium, boron, silver, rhodium, boron, and combinations thereof. According to some embodiments, the promoter is a precious metal that acts as a reduction promoter. The promoter is added to the cobalt FT catalyst in an amount sufficient to provide a weight ratio of elemental promoter to elemental cobalt between about 0.0001 and about 0.5, and preferably between about 0.001 and about 0.1 (dry basis). Preferably, the catalytic metal is supported. Suitable support materials include metal oxides, and combinations thereof. For example, suitable support materials include but are not limited to alumina, modified alumina, silica, titania, zirconia, titania, fluorided metal oxides, borated alumina, aluminum fluoride, aluminum boride, and combinations thereof. Alumina or modified alumina are the most preferred supports.

The FT process is typically run in a continuous mode. In this mode, typically, the gas hourly space velocity through the reaction zone may range from about 50 volumes/hour/reactor volume (v/hr/v) to about 10,000 v/hr/v, preferably from about 300 v/hr/v to about 2,000 v/hr/v. The gas hourly space velocity is defined at the standard condition where the pressure is 1 atm (101 kPa) and temperature is 0 degree centigrade (273.16 K). The reaction zone temperature is typically in the range from about 160° C. to about 300° C. Preferably, the reaction zone is operated at conversion promoting conditions at temperatures from about 190° C. to about 260° C. The reaction zone pressure is typically in the range of about 80 psia (552 kPa) to about 1000 psia (6895 kPa), more preferably from 80 psia (552 kPa) to about 600 psia (4137 kPa), and still more preferably, from about 140 psia (965 kPa) to about 500 psia (3447 kPa).

In the alcohol synthesis embodiment, any suitable process, operating conditions, catalysts, and the like as known to those of skill in the art may be used to convert syngas to one or more alcohols. Preferred alcohol synthesis processes include those for converting syngas to methanol. Examples of suitable alcohol synthesis processes are disclosed in, for example, U.S. Pat. Nos. 5,767,039, 4,628,065, 4,540,412, 4,339,413, and U.S. Publication H1311, each of which is incorporated herein in its entirety. Products produced in the alcohol synthesis reactor may be upgraded in upgrading unit 106, for example distilled to create a purified methanol product.

Any suitable reactor configuration that allows contact between the syngas and the synthesis catalyst may be employed for synthesis reactor 30. Examples of suitable synthesis reactors for the FT embodiment include slurry-bubble reactors and fixed bed reactors, such as tubular reactors. In a slurry-bubble reactor, the FT catalyst is suspended in a liquid phase of molten hydrocarbon wax by the motion of bubbles of syngas sparged into the bottom of the reactor. Cooling coils immersed in the slurry remove heat generated by the reaction. In a fixed bed reactor, the FT catalyst is held in a fixed bed that is suspended within the reactor vessel. The reactants flowing through the vessel contact the FT catalyst that is held in the fixed bed. The reaction heat is removed by passing a cooling medium around the tubes or vessels that contain the fixed bed.

In synthesis reactor 30, $H_2$ and CO combine in a polymerization-like fashion to form hydrocarbon compounds having varying numbers of carbon atoms. The hydrocarbon compounds are typically separated by boiling point into three streams, with each stream having the majority of the hydrocarbons falling within a given range of carbon atoms. In the preferred FT embodiment shown in the Figures, the first stream is a light liquid hydrocarbon stream 32 comprising liquid intermediate compounds, such as synthetic crude or paraffinic liquids, having about five to seventeen carbon atoms. The second stream is a heavy liquid hydrocarbon stream 34 comprising semi-solid heavy compounds, such as waxy hydrocarbons having greater than about seventeen carbon atoms. The third stream produced by synthesis reactor 30 is a light off-gas stream 36 comprising various components, such as water vapor ($H_2O$), carbon dioxide ($CO_2$), unreacted $H_2$ and CO, and light hydrocarbons having about one to six carbon atoms. Light off-gas stream 36 can be processed as needed (e.g., water removal) and recycled partially or completely to gas plant 12 to process the hydrocarbons therein.

Light hydrocarbon liquid stream 32, heavy hydrocarbon liquid stream 34, and a gas plant recovery stream 18, which comprises butanes and heavier hydrocarbons, may be fed to an upgrading process 38 such to form additional commercial products. Upgrading process 38 may include a refining process, a hydrotreater, and/or a hydrocracker (not individually shown) for upgrading the hydrocarbon liquids from the FT process. The long-chain hydrocarbon waxes such as those in heavy hydrocarbon liquid stream 34 are subjected to hydrogenation and shortening in the hydrotreater and thermal degradation in the presence of $H_2$ in the hydrocracker, thereby forming a distillate stream. The distillate stream and the light hydrocarbon liquid stream 32 are further refined to form product streams, such as naphtha stream 40, kerosene stream 42, and diesel stream 44. The naphtha, kerosene, and diesel streams are essentially free of sulfur and thus may be used to produce environmentally friendly low sulfur diesel fuels.

Figure 2:
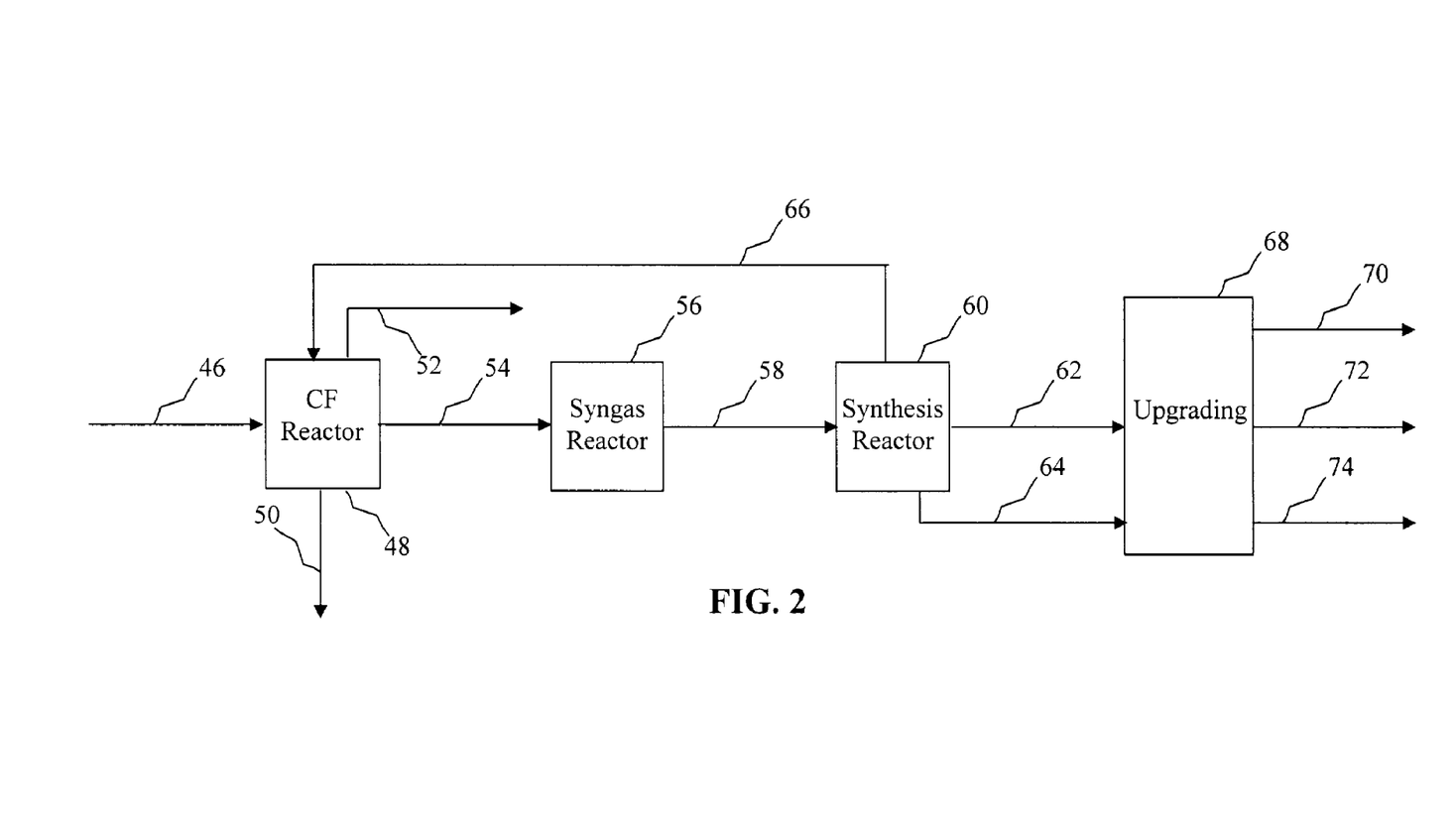
FIGS. 2–3 are process flow diagrams of alternative embodiments of the present invention.

FIG. 2 depicts an alternative embodiment of the invention in which methane is filtered from natural gas using a CF reactor that produces carbon filaments. More specifically, a natural gas stream 46 comprising mixed alkanes such as methane, ethane, and propane is fed to a CF reactor 48. The temperature required for carbon filament growth decreases as the number of carbon atoms for each alkane increases. Therefore, CF reactor 48 can be maintained at an effective temperature to convert hydrocarbons having two or more carbon atoms to carbon filaments and $H_2$, while a hydrocarbon having only one carbon atom, i.e., methane, remains substantially unconverted at the effective temperature. This effective temperature ranges from about 400° C. to about 750° C., preferably from about 450° C. to about 700° C., and more preferably from about 500° C. to about 650° C. As a result of operating CF reactor 48 at the effective temperature, C2+ alkanes (e.g., ethane and propane) in the natural gas are converted to carbon filaments, and methane is filtered from the natural gas for use in downstream processes. The particular temperature chosen for CF reactor 48 may be based on the desired selectivity to carbon filaments.

The CF reactor 48 contains a CF catalyst as discussed previously. The reaction conditions, other than the reaction temperature, and the CF catalyst composition and arrangement, e.g. shape and form, are the same as those described previously in relation to the CF process shown in FIG. 1. The CF reactor 48 effluent comprises carbon filaments, $H_2$, and unconverted ethane and propane. The $H_2$ produced in CF reactor 48 can be recovered using any known separation technique, such as membrane separation. Carbon filaments are removed from CF reactor 48 via product stream 50, $H_2$ is removed from CF reactor 48 via by-product stream 52 consisting essentially of hydrogen, and methane is removed from CF reactor 48 via methane stream 54 consisting essentially of methane. Although not shown, by-product stream 52 can be passed to other processes that use $H_2$.

Methane stream 54 may be passed from CF reactor 48 to a syngas reactor 56 to produce syngas via partial oxidation. The particular reaction conditions and catalyst composition employed for the syngas process are the same as those described above for the syngas process in FIG. 1. A syngas stream 58 comprising $H_2$ and CO is recovered from syngas reactor 56. In alternative embodiments, syngas reactor 56 may be replaced with other syngas production units capable of converting methane to syngas, such as a steam reformer and an auto-thermal reformer. Syngas stream 58 can be fed to a synthesis reactor 60, a preferred FT reactor in FIG. 2, to produce hydrocarbon compounds having varying numbers of carbon atoms. The reaction conditions and catalyst composition of the FT process in FIG. 2 are the same as those described previously for the FT process in FIG. 1.

The hydrocarbon compounds produced by synthesis reactor 60 may be separated by boiling point into three streams: (1) a light liquid hydrocarbon stream 62 comprising liquid intermediate compounds, such as synthetic crude or paraffinic liquids having about five to seventeen carbon atoms; (2) a heavy liquid hydrocarbon stream 64 comprising semi-solid heavy compounds, such as waxy hydrocarbons having greater than about seventeen carbon atoms; and (3) a light off-gas stream 66 comprising various components, such as $H_2O$, $CO_2$, unreacted $H_2$ and CO, and light gaseous hydrocarbons. Light off-gas stream 66 can be processed accordingly (e.g., water removal) and recycled to CF reactor 48 for use in the production of the carbon filaments. Light hydrocarbon liquid stream 62 and heavy hydrocarbon liquid stream 64 are fed to an upgrading process 68 to form commercial products, such as naphtha, kerosene, and diesel, which are recovered via streams 70, 72, and 74, respectively. Upgrading process 68 is operated in the manner described previously for the hydrocarbon upgrading process depicted in FIG. 1.

Figure 3:
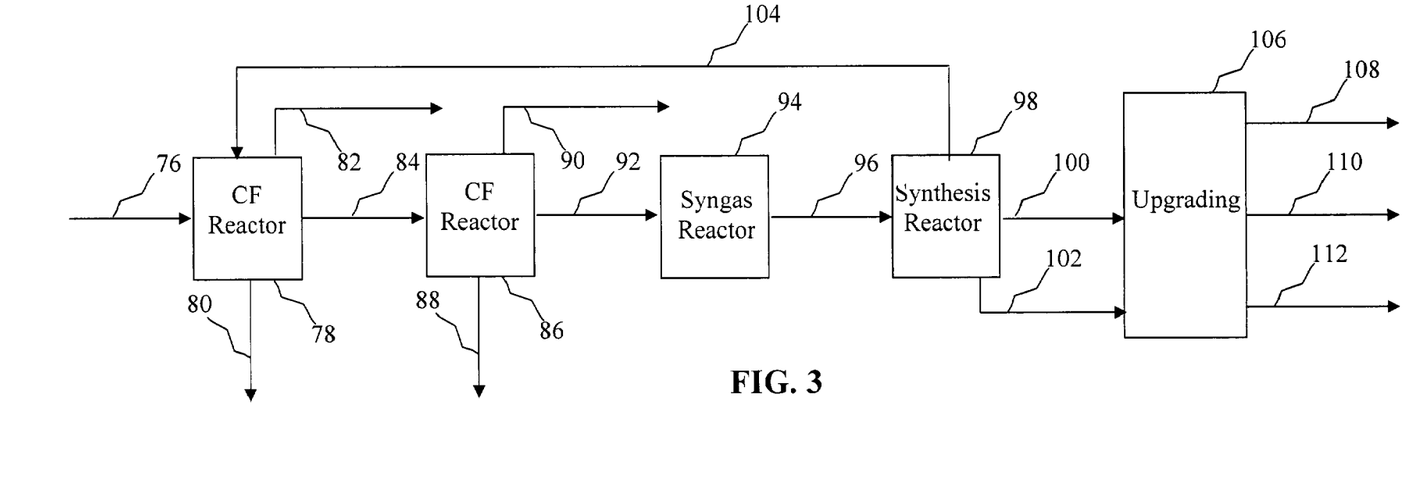

FIG. 3 illustrates an embodiment of the invention that is similar to the embodiment shown in FIG. 2 except for the use of two CF reactors in series to produce carbon filaments. More particularly, a natural gas stream 76 comprising mixed alkanes such as methane, ethane, and propane is fed to two CF reactors 78 and 86 in series. Each of these CF reactors 78 and 86 contains a CF catalyst. The reaction conditions, other than the reaction temperature and the CF catalyst composition and arrangement, e.g., shape and form, are the same as those described previously in relation to the CF process shown in FIG. 1.

The CF reactor 78 can be maintained at a first effective temperature to convert hydrocarbons having three or more carbon atoms to carbon filaments and $H_2$, while a hydrocarbon having only one or two carbon atoms, i.e., methane and ethane, remain substantially unconverted at the effective temperature. This first effective temperature ranges from about 400° C. to about 750° C., preferably from about 450° C. to about 700° C., and more preferably from about 500° C. to about 650° C. and is selected based on the desired selectivity to carbon filaments. As a result of operating CF reactor 78 at the first effective temperature, primarily propane in the natural gas is converted to carbon filaments, and methane and ethane are filtered from the natural gas for use in downstream processes. Therefore, the effluent from CF reactor 78 typically comprises carbon filaments, $H_2$, and unconverted hydrocarbons (e.g., methane, ethane, and propane). The $H_2$ produced in CF reactor 78 can be recovered using any known separation technique, such as membrane separation or cryogenic separation. Carbon filaments are removed from CF reactor 78 via product stream 80, $H_2$ is removed from CF reactor 78 via by-product stream 82 consisting essentially of hydrogen, and the methane, ethane, and propane are removed from CF reactor 78 via stream 84. Although not shown, by-product stream 82 can be passed to other processes that use $H_2$.

The stream 84 recovered from CF reactor 78 is fed to CF reactor 86, which is maintained at a second effective temperature to convert primarily the ethane and the unconverted propane in stream 84 to carbon filaments and $H_2$. Preferably, the majority of the ethane and the propane in stream 84 are converted to carbon filaments and $H_2$ such that stream 92 consists essentially of methane. The methane in CF reactor 86 remains substantially unconverted at the second effective temperature and thus may be recovered from CF reactor 78 for use in downstream processes. Preferably, the effective temperature in the second (i.e., downstream) reactor is greater than the effective temperature in the first (i.e., upstream) reactor. Specifically, the second effective temperature ranges from about 500° C. to about 850° C., preferably from about 600° C. to about 800° C., and more preferably from about 650° C. to about 750° C. The carbon filaments are removed from CF reactor 86 via stream 88, and the $H_2$ is removed from CF reactor 86 via by-product stream 90 consisting essentially of hydrogen, which-can be passed to other processes that use $H_2$. Where economically advantageous to do so, additional CF reactors can be added in series to convert any remaining C2+ alkanes, and the number of reactors is preferably optimized such that the effluent from the last reactor (other than hydrogen and carbon filaments) consists essentially of methane.

In addition, methane is removed from CF reactor 86 via stream 92, preferably consisting essentially of methane, and is fed to a syngas reactor 94 to produce syngas via partial oxidation. The reaction conditions and catalyst composition employed for this syngas process are the same as those described above for the syngas process in FIG. 1. A syngas stream 96 comprising $H_2$ and CO is recovered from syngas reactor 94. In alternative embodiments, syngas reactor 94 may be replaced with other syngas production units capable of converting methane to syngas, such as a steam reformer and an auto-thermal reformer. Syngas 96 can be fed to a synthesis reactor 98, a preferred FT reactor in FIG. 3, to produce hydrocarbon compounds having varying numbers of carbon atoms. The reaction conditions and catalyst composition of the FT process in FIG. 3 are the same as those described previously for the FT process in FIG. 1.

The hydrocarbon compounds produced by synthesis reactor 98 may be separated by boiling point into a light liquid hydrocarbon stream 100 comprising liquid intermediate compounds, a heavy liquid hydrocarbon stream 102 comprising semi-solid heavy compounds, and a light off-gas stream 104 comprising various components, such as $H_2O$, $CO_2$, unreacted $H_2$ and CO, and light gaseous hydrocarbons. Light off-gas stream 104 can be processed accordingly (e.g., water removal) and recycled to CF reactor 78 for use in the production of the carbon filaments. Light hydrocarbon liquid stream 100 and heavy hydrocarbon liquid stream 102 are fed to an upgrading process 106 to form commercial products, such as naphtha, kerosene, and diesel, which are recovered via streams 108, 110, and 112, respectively. Upgrading process 106 is operated in the manner described previously for the hydrocarbon upgrading process depicted in FIG. 1.

While the preferred embodiments of the invention have been shown and described, modifications thereof can be made by one skilled in the art without departing from the spirit and teachings of the invention. Reactor design criteria, pendant hydrocarbon processing equipment, and the like for any given implementation of the invention will be readily ascertainable to one of skill in the art based upon the disclosure herein. The embodiments described herein are exemplary only, and are not intended to be limiting. Many variations and modifications of the invention disclosed herein are possible and are within the scope of the invention. Accordingly, the scope of protection is not limited by the description set out above, but is only limited by the claims which follow, that scope including all equivalents of the subject matter of the claims.

What is claimed is:

1. A process for filtering methane from natural gas comprising contacting natural gas with a metal catalyst under reaction conditions such that substantially all $C_{2+}$ hydrocarbons in the natural gas are converted to carbon filaments and hydrogen, with the remaining filtered natural gas consisting essentially of methane.

2. An integrated process for the conversion of natural gas to products, comprising:
   (a) converting $C_{2+}$ hydrocarbons in the natural gas directly to carbon filaments by contact with a metal catalyst;
   (b) converting methane in the natural gas to syngas comprising hydrogen and carbon monoxide, wherein the methane is removed from the natural gas by the conversion in step (a); and
   (c) converting the syngas to products via post-processing of the syngas.

3. The process of claim 2 wherein the syngas is converted to hydrocarbon liquids via a Fischer-Tropsch reaction.

4. The process of claim 2 wherein the syngas is converted to alcohol via an alcohol synthesis reaction.

* * * * *